United States Patent
Lin et al.

(10) Patent No.: US 11,196,358 B2
(45) Date of Patent: Dec. 7, 2021

(54) ENERGY GENERATING DEVICE

(71) Applicant: NATIONAL TSING HUA UNIVERSITY, Hsinchu (TW)

(72) Inventors: Zong-Hong Lin, Hsinchu (TW); Da-Jeng Yao, Hsinchu (TW); Hsuan-Yu Lin, Hsinchu County (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/845,043

(22) Filed: Apr. 9, 2020

(65) Prior Publication Data
US 2021/0226558 A1 Jul. 22, 2021

(30) Foreign Application Priority Data
Jan. 22, 2020 (TW) .................... 109102634

(51) Int. Cl.
*H02N 1/04* (2006.01)
(52) U.S. Cl.
CPC ...................... *H02N 1/04* (2013.01)
(58) Field of Classification Search
CPC .. H02N 1/04; H02N 1/06; H02N 1/00; H02N 1/08
USPC .................................. 310/309, 310
See application file for complete search history.

(56) References Cited

U.S. PATENT DOCUMENTS

| | | | |
|---|---|---|---|
| 2006/0077762 A1* | 4/2006 | Boland | H02N 11/002 367/170 |
| 2014/0346782 A1* | 11/2014 | Pak | H02N 1/08 290/1 R |
| 2016/0322918 A1 | 11/2016 | Chen et al. | |
| 2019/0280620 A1 | 9/2019 | Ma et al. | |

FOREIGN PATENT DOCUMENTS

| | | |
|---|---|---|
| CN | 100503251 C | 6/2009 |
| CN | 204425204 U | 6/2015 |
| TW | M531098 U | 10/2016 |
| TW | M542886 U | 6/2017 |

(Continued)

OTHER PUBLICATIONS

Coalescence of Drops Near a Hydrophilic Boundary Leads to Long Range Directed Motion (Year: 2014).*

(Continued)

*Primary Examiner* — Ahmed Elnakib
(74) *Attorney, Agent, or Firm* — CKC & Partners Co., LLC

(57) ABSTRACT

An automatic powering device includes a dielectric layer, a driving layer, a plurality of electrodes and a droplet. The dielectric layer includes a first surface and a second surface opposite to the first surface. The driving layer faces toward the dielectric layer thereby forming a channel between the driving layer and the dielectric layer. The driving layer includes a plurality of hydrophilic surfaces facing toward the first surface and a plurality of hydrophobic surfaces facing toward the first surface. Each of the hydrophilic surfaces is staggered from each of the hydrophobic surfaces. The elec- (Continued)

trodes are disposed at the second surfaces. The electrodes each are electrically connected to and spaced from each other. The droplet is flowable within the channel. The droplet is affected by the hydrophilic surfaces and the hydrophobic surfaces so as to flow in the channel.

12 Claims, 4 Drawing Sheets

(56) References Cited

FOREIGN PATENT DOCUMENTS

| | | |
|---|---|---|
| TW | 201726992 A | 8/2017 |
| TW | 201906297 A | 2/2019 |

OTHER PUBLICATIONS

Reverse electrowetting as a new approach to high-power energy harvesting (Year: 2011).*

Hsuan-Yu Lin et al., "Hydropower Energy Harvest By Triboelectric Nanogenerator Performed in Droplet-Based Microfluidic System", The 14th Annual IEEE International Conference on Nano/Micro Engineered and Molecular Systems (NEMS), dated on Apr. 11-14, 2019, Poster, Thailand.

* cited by examiner

ENERGY GENERATING DEVICE

RELATED APPLICATIONS

This application claims priority to Taiwan Application Serial Number 109102634, filed Jan. 22, 2020, which is herein incorporated by reference.

BACKGROUND

Technical Field

The present disclosure relates to a powering device. More particularly, the present disclosure relates to an automatic powering device employing a flowable droplet.

Description of Related Art

Nowadays, owing to the progress of the technology, wearable electronic devices have received great attention. Because the wearable electronic devices need power sources to provide the electric energy, development of the power sources has become an urgent matter.

A triboelectric generator is an automatic powering device, and through continuously contacting and separating two triboelectric layers, generated electrons therefrom can flow to an outer circuit to form a current. In addition to operate the two triboelectric layers in a contact-separation mode, electrons can also be generated by moving a droplet to contact with or separate from a fixing layer. However, the application of the droplet is limited by the characteristics thereof, and how to effectively drive the droplet to contact with or separate from the fixing layer becomes a pursuit target for the practitioners.

SUMMARY

According to one aspect of the present disclosure, an automatic powering device including a dielectric layer, a driving layer, a plurality of electrodes and a droplet is provided. The dielectric layer includes a first surface and a second surface opposite to the first surface. The driving layer faces toward the dielectric layer thereby forming a channel between the driving layer and the dielectric layer. The driving layer includes a plurality of hydrophilic surfaces facing toward the first surface and a plurality of hydrophobic surfaces facing toward the first surface. Each of the hydrophilic surfaces is staggered from each of the hydrophobic surfaces. The electrodes are disposed at the second surfaces. The electrodes each are electrically connected to and spaced from each other. The droplet is flowable within the channel. The droplet is affected by the hydrophilic surfaces and the hydrophobic surfaces so as to flow in the channel.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected or" or "coupled to" another element, it can be directly disposed on, connected or coupled to the other elements, or it can be indirectly disposed on, connected or coupled to the other elements, that is, intervening elements may be present. In contrast, when an element is referred to as be "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
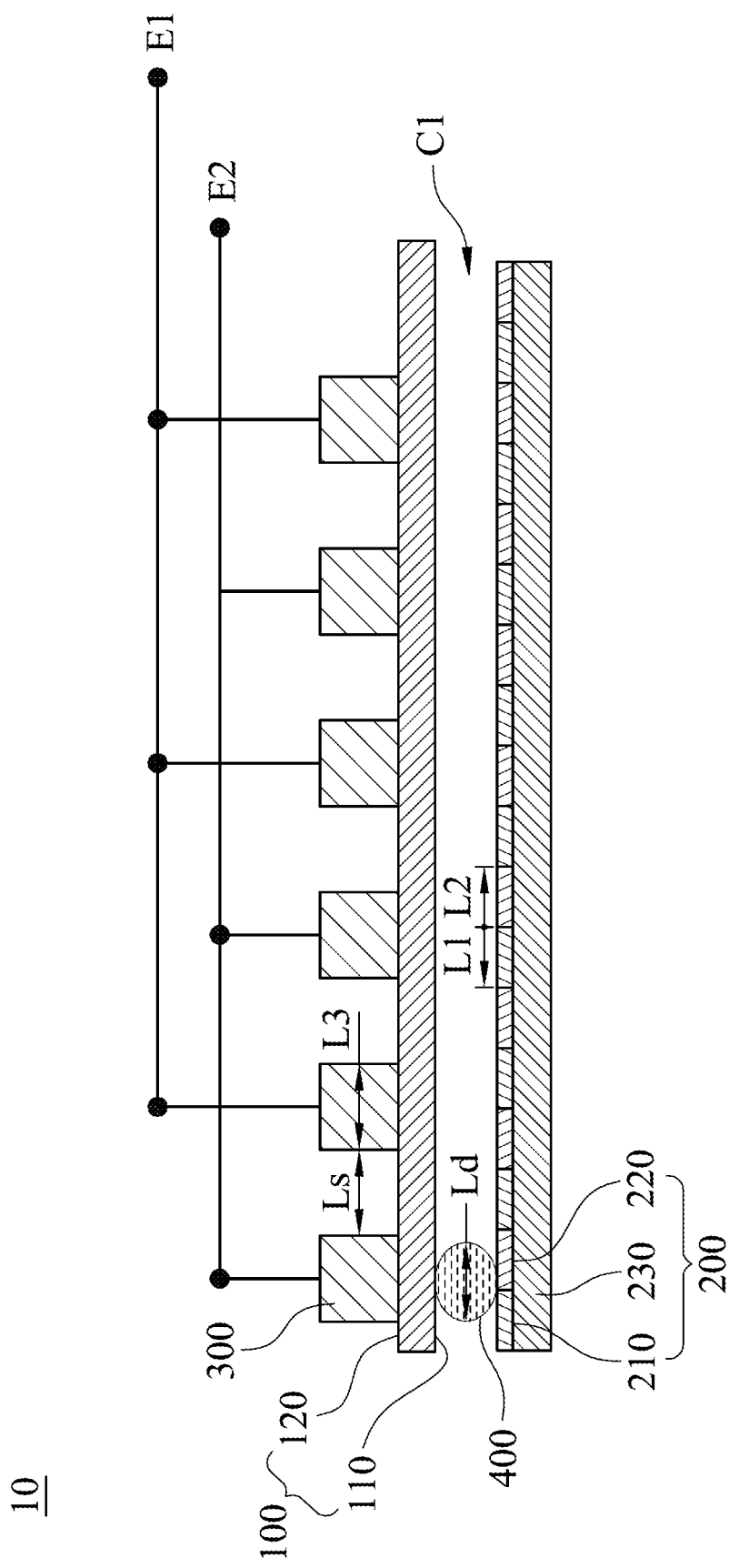
FIG. 1 shows a cross-sectional view of an automatic powering device according to one embodiment of the present disclosure.

FIG. 1 shows a cross-sectional view of an automatic powering device 10 according to one embodiment of the present disclosure. The automatic powering device 10 includes a dielectric layer 100, a driving layer 200, a plurality of electrodes 300 and a droplet 400. The dielectric layer 100 includes a first surface 110 and a second surface 120 opposite to the first surface 110. The driving layer 200 faces toward the dielectric layer 100 thereby forming a channel C1 between the driving layer 200 and the dielectric layer 100. The driving layer 200 includes a plurality of hydrophilic surfaces 210 facing toward the first surface 110 and a plurality of hydrophobic surfaces 220 facing toward the first surface 110. Each of the hydrophilic surfaces 210 is staggered from each of the hydrophobic surfaces 220. The electrodes 300 are disposed at the second surface 120. The electrodes 300 each are electrically connected to and separated from each other. The droplet 400 is flowable within the channel C1. The droplet 400 is affected by the hydrophilic surfaces 210 and the hydrophobic surfaces 220 so as to flow in the channel C1.

Therefore, since the hydrophilic surfaces 210 and the hydrophobic surfaces 220 of the driving layers 200 are arranged in a staggered arrangement, the droplet 400 can be affected by the attraction and the repulsion so as to flow in the channel C1, and the electrodes 300 can generate induced charges. The details of the automatic powering device 10 will be described hereafter.

The electrodes 300 can be made of a conductive material, such as metals and alloys. The metals can be, but no limited to, Au, Ag, Pt, Pd, Al, Ni, Cu, Ti, Cr, Se, Fe, Mn, Mo, W or V. The alloys can be, but no limited to, aluminum alloy, titanium alloy, magnesium alloy, copper alloy, zinc alloy, nickel alloy, lead alloy, tin alloy, cadmium alloy, bismuth alloy, indium alloy, gallium alloy, tungsten alloy, molybdenum alloy, silver alloy or tantalum alloy. In addition, the conductive materials can be selected from indium tin oxide, graphene, derivatives thereof and so on.

The dielectric layer 100 is made of a dielectric material, and the dielectric material can be inorganic materials or organic materials. The inorganic materials can be, but not limited to, $SiO_2$, $Si_3N_4$, $SiO_xN_y$, $Ta_2O_5$, $TiO_2$, $HfO_2$, $ZrO_2$, $Al_2O_3$, $La_2O_3$ or $Pr_2O_3$. The organic materials can be, but not limited to, polyethersulfone (PES), polyetheretherketone (PEEK), polyvinylidene fluoride (PVDF), polydimethylsiloxane (PDMS), rubbers or polytetrafluoroethylene (PTFE). Moreover, dielectric materials with high dielectric constant can facilitate the inducing effect. In view of the easy fabrication of the organic materials, the dielectric layer 100 of the embodiment of FIG. 1 can be made of PTFE.

The droplet 400 can be polar liquids or non-polar liquids. The polar liquids can be, but not limited to, formic acid, methanol, ethanol, n-propanol, isopropanol, butyl alcohol, acetic acid, dimethyl sulfoxide (DMSO), dimethylformamide (DMF), acetonitrile or acetone. The non-polar liquids can be, but not limited to, hexane, benzene, toluene, diethyl ether, chloroform, ethyl acetate, tetrahydrofuran or dichloromethane. The droplet 400 can be initially charged, and even though the droplet 400 is not initially charged, the droplet 400 can still be charged when contacting with the driving layer 200. As the droplet 400 flows in the channel C1, the droplet 400 will correspond to one of the electrodes 300 at one moment, and will separate from the one of the electrodes 300 at the next moment, thereby allowing the one of the electrodes 300 to generate induced charges.

Figure 2:
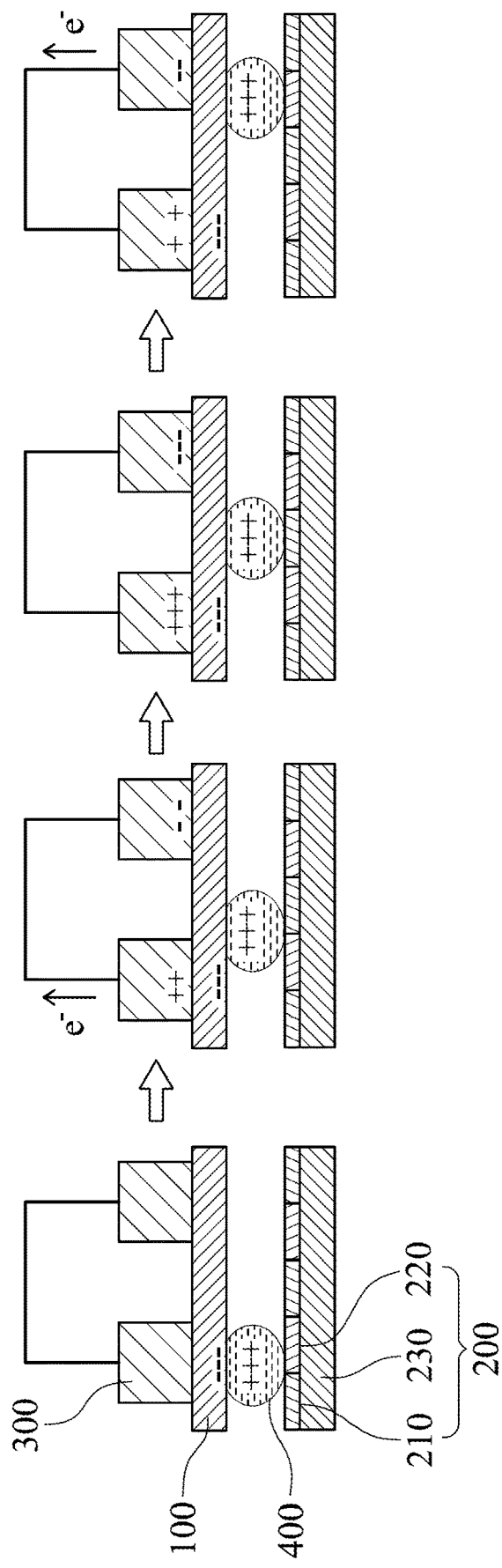
FIG. 2 shows an operating illustration of the automatic powering device of FIG. 1.

FIG. 2 shows an operating illustration of the automatic powering device 10 of FIG. 1. Please refer to FIG. 2 with reference of FIG. 1, in the beginning, the droplet 400 can include, for example, positive charges, and a corresponding portion of the dielectric layer 100 can generate negative charges such that the positive charges are in balance with the negative charges and no charge transfer will occur in the electrode 300 corresponding thereto. After the droplet 400 flows, the charges of the corresponding one of the electrodes 300 transfer, and electrons e$^-$ flow out from the corresponding one of the electrodes 300 to form a current until the positive charges are in balance with the negative charges again. Subsequently, the droplet 400 flows continuously to correspond to a next one of the electrodes 300, and charges of the next one of the electrodes 300 transfer, thereby forming alternative currents.

Therefore, as the plurality of electrodes 300 are arranged in sequence, the droplet 400 can contact with or separate from the electrodes 300 continuously to form currents. In such a situation, one of the electrodes 300 can be electrically connected to a first electric terminal E1, and another two of the electrodes 300 which are adjacent to the one of the electrodes 300 are electrically connected to a second electric terminal E2. The electrodes 300 are electrically connected the to the first electric terminal E1 and the second electric terminal E2 in an order that, the first one of the electrodes 300 is connected to the first electric terminal E1, the second one of the electrodes 300 is connected to the second electric terminal E2, the third one of the electrodes 300 is connected to the first electric terminal E1, the fourth one of the electrodes 300 is connected to the second electric terminal E2, and so on, thereby allowing the electrodes 300 whose current flows into the same direction being connected to the same electric terminal, i.e., the first electric terminal E1 or the second electric terminal E2.

Moreover, the electrodes 300 and the droplet 400 satisfy $Ld \le Ls$, and the electrodes satisfy $Ls = L3$. The electrodes 300 are spaced from each other with a gap therebetween. Ls represents a length of the gap. Ld represents a diameter of the droplet 400. L3 represents a length of each of the electrodes 300. In other words, each two adjacent electrodes 300 are separated by the gap having the length Ls. The droplet 400 can totally correspond to one of the electrodes 300 at one moment, and can totally correspond to the gap but not any one of the electrodes 300 at another moment. Consequently, the electrodes 300 can be fully discharged. In addition, each of the electrodes 300 and the droplet 400 can satisfy $Ld \le L3$, but the present disclosure is not limited thereto.

In order to make the droplet 400 move in the channel C1 automatically, the driving layer 200 includes the hydrophilic surfaces 210 for attracting droplet 400 and the hydrophobic surfaces 220 for repulsing the droplet 400. With arranging the hydrophilic surfaces 210 and hydrophobic surfaces 220 in a staggered arrangement, the droplet 400 can be driven.

In the embodiment of FIGS. 1 and 2, each of the hydrophilic surfaces 210 is made of a hydrophilic material, and each of the hydrophobic surfaces 220 is made of a hydrophobic material. To be more specific, the driving layer 200 can further include a base 230, and the hydrophilic surfaces 210 and the hydrophobic surfaces 220 are coated on the base 230. Nevertheless, the present disclosure is not limited thereto.

The hydrophilic material can be, but not limited to, glasses, $SiO_2$, polyvinyl alcohol (PVA), polyacrylamide (PAAM), (polyacrylic resin, carboxymethyl cellulose (CMC) or polyethylene oxide (PEO).

The hydrophobic material can be, but not limited to, PTFE, amorphous fluoropolymers, polydimethylsiloxane (PDMS), polyethylene (PE), polypropylene (PP), polystyrene (PS), Polymethyl methacrylate (PMMA) or Polyethylene terephthalate (PET).

Please be noted that, due to the space constraints, the abovementioned materials are non-exhaustively listed. It will be understood by a person skilled in the art that the abovementioned materials can be substituted by any known or predictable materials, and the present disclosure is not limited thereto.

In other embodiments, each of the hydrophilic surfaces can include a plurality of first structures, and each of the hydrophobic surfaces can include a plurality of second structures. The first structures and the second structures satisfy $D1<D2$. D1 represents a first density of the first structures on each of the hydrophilic surfaces, and D2 represents a second density of the second structures on each of the hydrophobic surfaces. Precisely, the first structures and the second structures can be formed on the base of the driving layers. The shapes of the first structures can be identical to the shapes of the second structures, but the density of the first structures is different from the density of the second structures. Each of the first structures and the second structures can be a one dimensional structure formed by a chemical method, or can be formed by a photoetching method or an ion etching method. Each of the first structures and the second structures can be a nanotube, a nanoparticle, a nanobar, a nanoflower, a nanogroove, a microgroove, a nanocone, a microcone, a nanoball or a microball. The size of each of the first structures and the second structures can be smaller than the diameter of the droplet, but the present disclosure is not limited thereto.

Furthermore, each of the hydrophilic surfaces 210, each of the hydrophobic surfaces 220 and each of the electrodes 300 satisfy $L1=L2 \le L3$. L1 represents a length of each of the hydrophilic surfaces 210, and L2 represents a length of each of the hydrophobic surfaces 220. When satisfying $L1=L2 \le L3$, the driving layer 200 can easily drive the droplet 400 to separate from or correspond to one of the electrodes 300.

Figure 3:
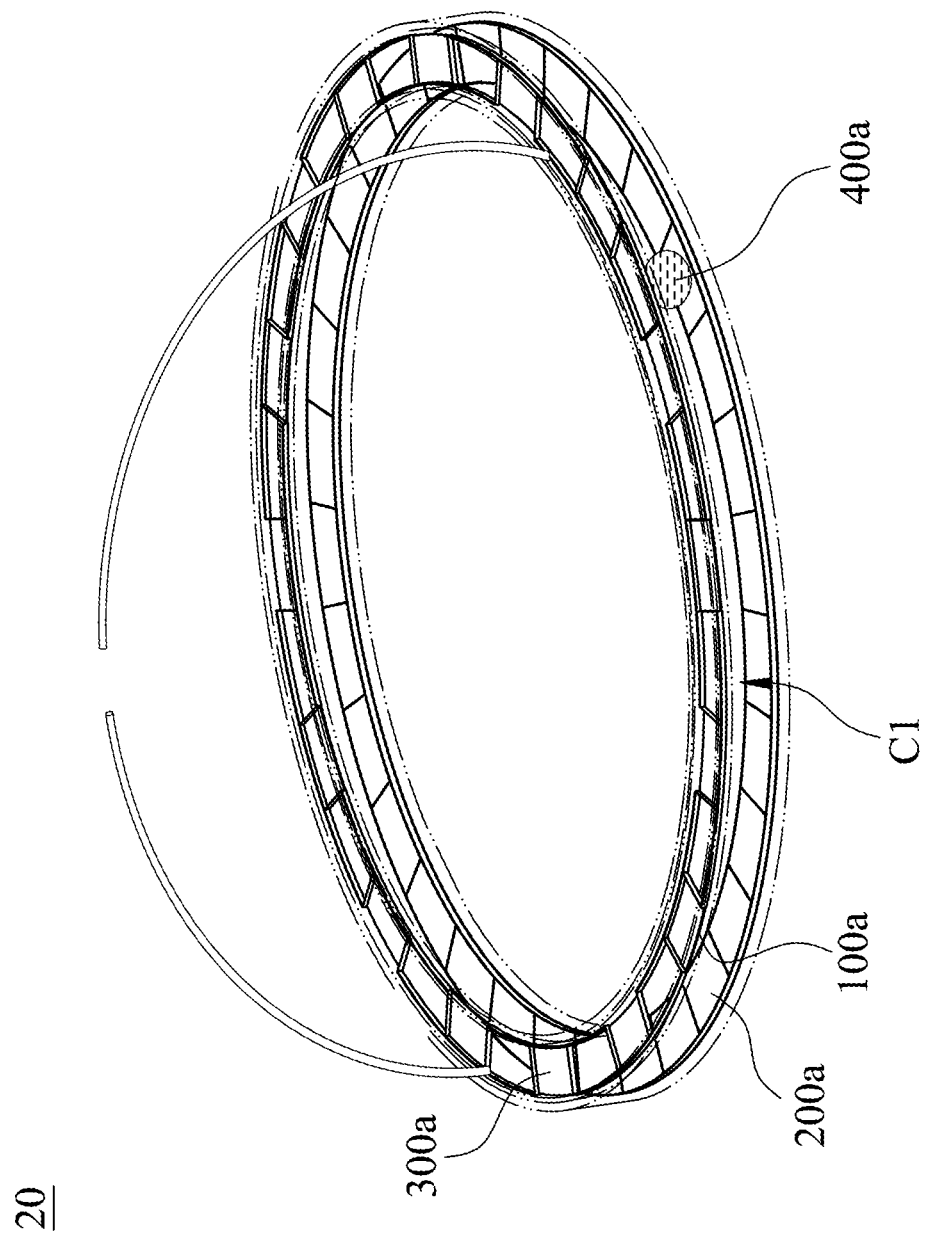
FIG. 3 shows a three dimensional schematic view of an automatic powering device according to another embodiment of the present disclosure.
Figure 4:
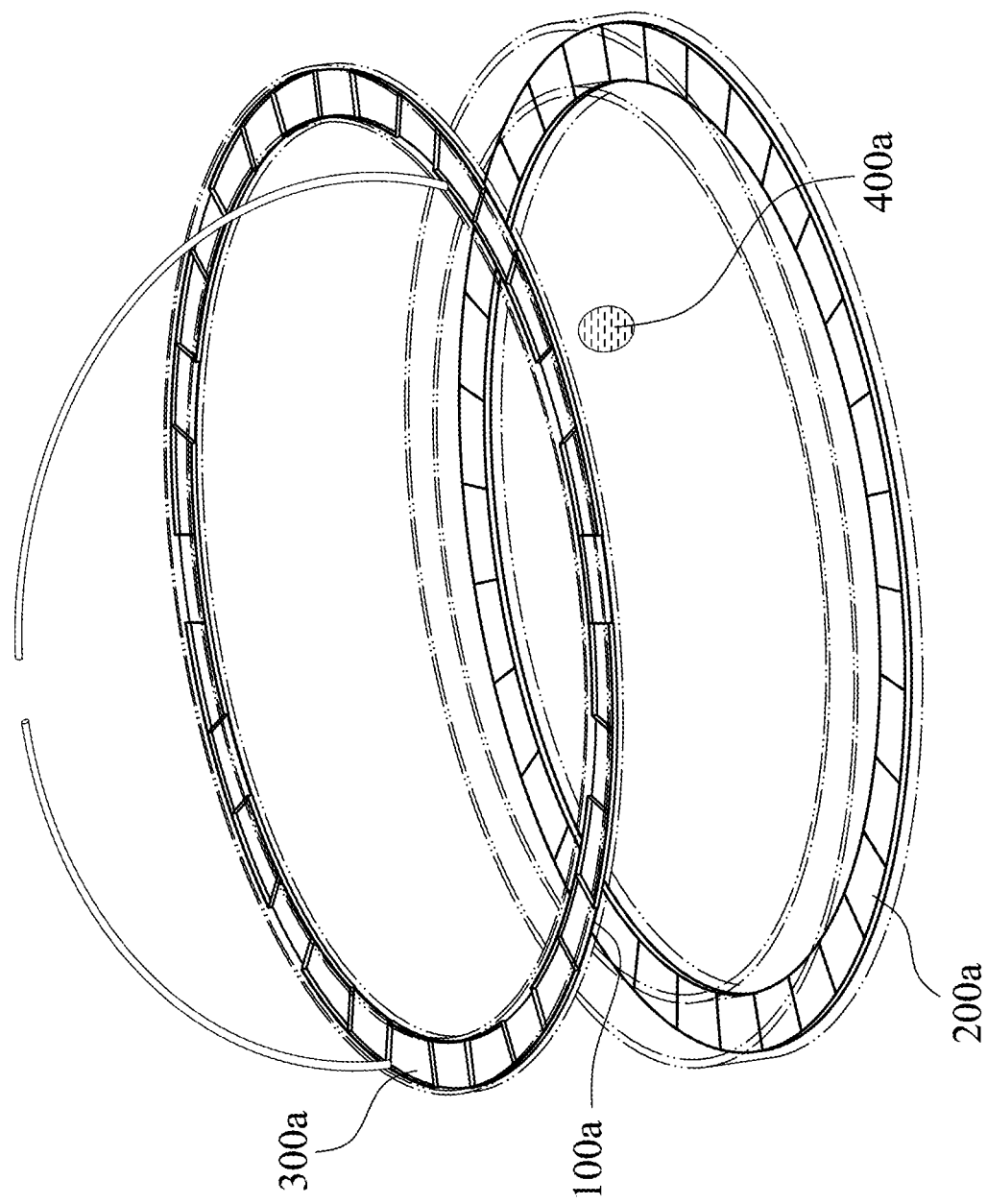
FIG. 4 shows an exploded view of the automatic powering device of FIG. 3.

FIG. 3 shows a three dimensional schematic view of an automatic powering device 20 according to another embodiment of the present disclosure. FIG. 4 shows an exploded view of the automatic powering device 20 of FIG. 3. The automatic powering device 20 is similar to the automatic powering device 10 of FIG. 1 and includes a dielectric layer 100a, a driving layer 200a, a plurality of electrodes 300a and a droplet 400a. The difference between the automatic powering device 20 and the automatic powering device 10 is that the channel C1 in FIG. 3 has a circular structure such that the droplet 400a can flow in the channel C1 repeatedly.

Precisely, the dielectric layer 100a and the driving layer 200a are ring-shaped, and the channel C1 formed therebetween is also ring-shaped. In such configuration, the droplet 400a can move in the channel C1 continuously and repeatedly and therefore the automatic powering device 20 can keep generating currents. Even if the forces of the droplet 400a are balanced and the droplet 400a remains static, the droplet 400a can move again as the user shakes the automatic powering device 20 to make the force of the droplet 400a be unbalanced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An energy generating device, comprising:
   a dielectric layer, comprising:
      a first surface; and
      a second surface opposite to the first surface;
   a driving layer facing toward the dielectric layer thereby forming a channel between the driving layer and the dielectric layer, the driving layer comprising:
      a plurality of hydrophilic surfaces facing toward the first surface; and
      a plurality of hydrophobic surfaces facing toward the first surface, each of the hydrophilic surfaces staggered from each of the hydrophobic surfaces;
   a plurality of electrodes disposed at the second surface without being disposed on the driving layer, the electrodes each electrically connected to and spaced from each other; and
   a droplet flowable within the channel;
   wherein the droplet is affected by the hydrophilic surfaces and the hydrophobic surfaces so as to flow in the channel.

2. The energy generating device of claim 1, wherein each of the hydrophilic surfaces is made of a hydrophilic material.

3. The energy generating device of claim 1, wherein each of the hydrophobic surfaces is made of a hydrophobic material.

4. The energy generating device of claim 1, wherein each of the hydrophilic surfaces comprises a plurality of first structures, each of the hydrophobic surfaces comprises a plurality of second structures, and the first structures and the second structures satisfy D1<D2, wherein D1 represents a first density of the first structures on each of the hydrophilic surfaces, and D2 represents a second density of the second structures on each of the hydrophobic surfaces.

5. The energy generating device of claim 1, wherein each of the hydrophilic surfaces, each of the hydrophobic surfaces and each of the electrodes satisfy L1=L2≤L3, wherein L1 represents a length of each of the hydrophilic surfaces, L2 represents a length of each of the hydrophobic surfaces, and L3 represents a length of each of the electrodes.

6. The energy generating device of claim 1, wherein each of the electrodes and the droplet satisfy Ld≤L3, wherein L3 represents a length of each of the electrodes, and Ld represents a diameter of the droplet.

7. The energy generating device of claim 1, wherein the electrodes and the droplet satisfy Ld≤Ls, and the electrodes are spaced from each other with a gap therebetween, wherein Ls represents a length of the gap, and Ld represents a diameter of the droplet.

8. The energy generating device of claim 1, wherein the electrodes satisfy Ls=L3, and the electrodes are spaced from each other with a gap therebetween, wherein Ls represents a length of the gap, and L3 represents a length of each of the electrodes.

9. The energy generating device of claim 1, wherein the dielectric layer is made of a dielectric material.

10. The energy generating device of claim 1, wherein one of the electrodes is electrically connected to a first electric terminal, and another two of the electrodes which are adjacent to the one of the electrodes are electrically connected to a second electric terminal.

11. The energy generating device of claim 1, wherein the channel has a circular structure such that the droplet flows in the channel repeatedly.

12. An energy generating device, comprising:
   a dielectric layer, comprising:
      a first surface; and
      a second surface opposite to the first surface;
   a driving layer facing toward the dielectric layer thereby forming a channel between the driving layer and the dielectric layer, the driving layer comprising:
      a plurality of hydrophilic surfaces facing toward the first surface; and
      a plurality of hydrophobic surfaces facing toward the first surface, each of the hydrophilic surfaces staggered from each of the hydrophobic surfaces;
   a plurality of electrodes disposed at the second surface, the electrodes each electrically connected to and spaced from each other; and
   a droplet flowable within the channel;
   wherein the droplet is affected by the hydrophilic surfaces and the hydrophobic surfaces so as to flow in the channel, each of the electrodes and the droplet satisfy Ld≤L3, L3 represents a length of each of the electrodes, and Ld represents a diameter of the droplet.

* * * * *